(12) United States Patent
Fritschi

(10) Patent No.: US 7,823,352 B2
(45) Date of Patent: Nov. 2, 2010

(54) CONSTRUCTION ELEMENT FOR HEAT INSULATION

(75) Inventor: Hubert Fritschi, Pfinztal (DE)

(73) Assignee: Schöck Bauteile GmbH, Baden-Baden (DE)

(*) Notice: Subject to any disclaimer, the term of this patent is extended or adjusted under 35 U.S.C. 154(b) by 872 days.

(21) Appl. No.: 11/506,220

(22) Filed: Aug. 18, 2006

(65) Prior Publication Data

US 2007/0039263 A1   Feb. 22, 2007

(30) Foreign Application Priority Data

Aug. 18, 2005   (DE) ................. 10 2005 039 025

(51) Int. Cl.
  *E04B 5/18* (2006.01)
  *E04B 5/23* (2006.01)
(52) U.S. Cl. ............ 52/405.3; 52/223.7; 52/223.6; 52/432; 52/433; 52/259
(58) Field of Classification Search ........... 52/223.7, 52/223.6, 223.8, 223.9, 223.11, 378, 379, 52/438, 583.1, 405.3, 432, 433, 259
See application file for complete search history.

(56) References Cited

U.S. PATENT DOCUMENTS

| | | | | |
|---|---|---|---|---|
| 3,495,367 A | * | 2/1970 | Kobayashi | 52/223.6 |
| 3,555,753 A | * | 1/1971 | Magadini | 52/223.7 |
| 4,757,656 A | * | 7/1988 | Powers, Jr. | 52/204.2 |
| 4,959,940 A | * | 10/1990 | Witschi | 52/583.1 |
| 5,799,457 A | * | 9/1998 | Schumacher et al. | 52/405.3 |
| 6,308,478 B1 | * | 10/2001 | Kintscher et al. | 52/223.7 |
| 6,345,473 B1 | * | 2/2002 | Fink et al. | 52/167.1 |

FOREIGN PATENT DOCUMENTS

| | | |
|---|---|---|
| AT | 395622 | 2/1993 |
| DE | 4302682 | 8/1994 |
| DE | 9417777.5 | 1/1995 |
| DE | 19640652 | 4/1998 |
| EP | 0609545 | 8/1994 |
| EP | 0657592 | 6/1995 |
| FR | 2562933 A1 * | 10/1985 |
| GB | 2161842 A * | 1/1986 |
| GB | 2169932 A * | 7/1986 |

* cited by examiner

*Primary Examiner*—Phi Dieu Tran A
(74) *Attorney, Agent, or Firm*—Volpe and Koenig, P.C.

(57) ABSTRACT

A construction element for heat insulation between two construction parts, in particular between a building part and a protruding exterior part, is provided, and includes an insulating body (2) to be arranged between the two construction parts with reinforcement elements (4, 5, 6) that can cross it and that can be connected to the two construction parts, with at least shear force rods (6) being provided as reinforcement elements. The construction element is here adjusted for the installation in passively energy conserving houses such that the insulating body is provided with a protrusion (3), which includes open recesses (7) for the upper exit sections (6f) of the shear force rods (6) that extend out of the insulating body, and extend in the direction of the supporting building part to the area of the horizontally protruding shear force rod sections (6a) so that it laterally overlaps the bent shear force rod sections (6d) in their entirety.

9 Claims, 1 Drawing Sheet

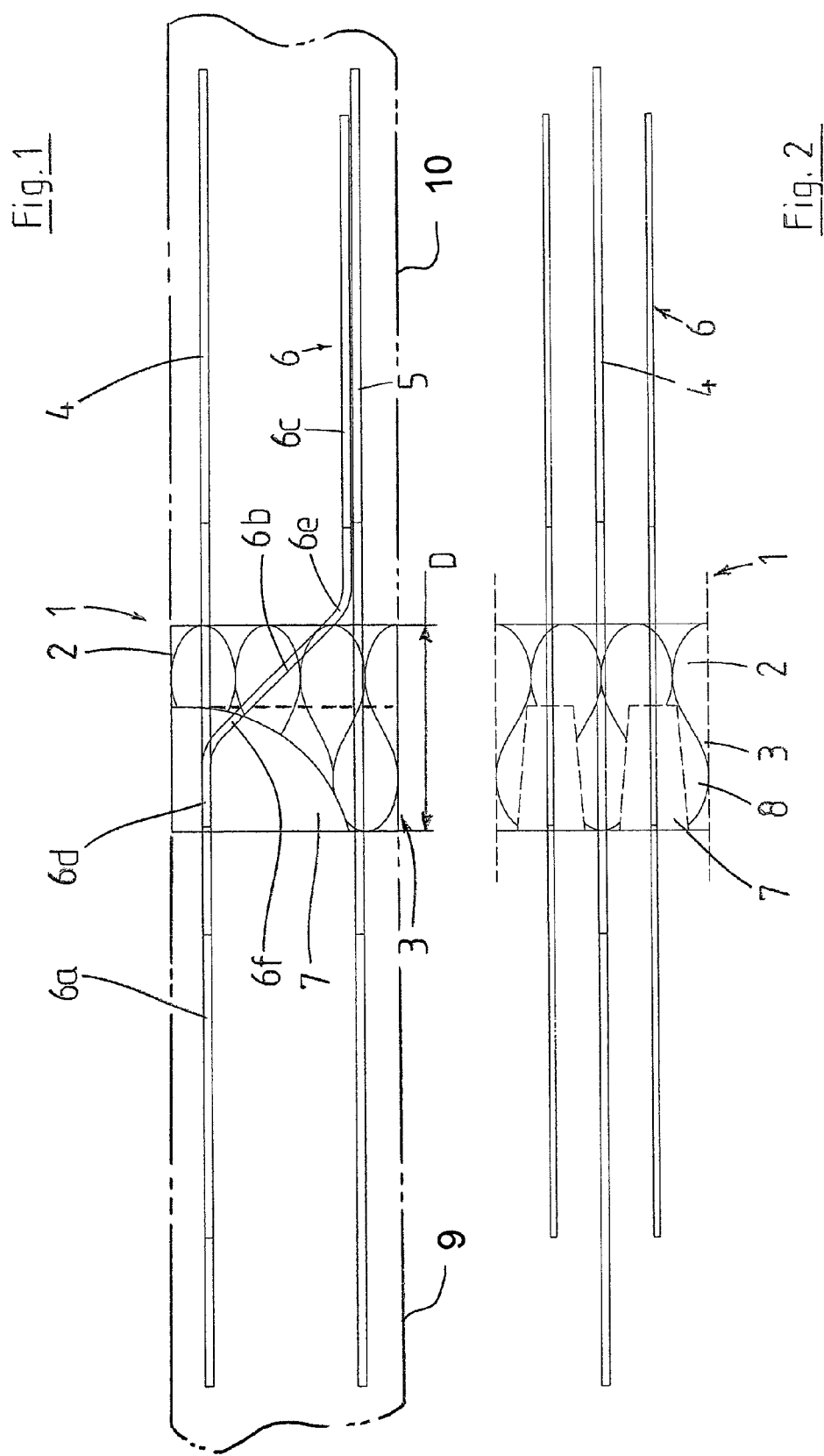

CONSTRUCTION ELEMENT FOR HEAT INSULATION

BACKGROUND

The invention relates to a construction element for heat insulation between two construction parts, in particular between a building part and a protruding exterior part, comprising an insulating body to be arranged between the two construction parts, having reinforcement elements that can be connected to both construction parts, with at least shear force rods being provided as reinforcement elements, which essentially extend in a sloped manner inside the insulation body in vertical planes parallel in reference to one another, and which, in order to connect to the two construction parts, are bent in the upper section allocated to the supporting construction part and the lower section allocated to the supported construction part such that they protrude horizontally at different heights from the insulating body in the above-mentioned vertical planes.

Such embodiments of construction elements for heat insulation have been used for a long time and are usually provided for this purpose with an 8 cm thick insulating body, which separates protruding exterior parts, such as e.g., balconies from building parts as well as, in particular, ceilings, with said approximately 8 cm thick insulating body being equivalent to the thickness of the previously common exterior insulation usually to be mounted to housing walls. However, in recent years the thickness of exterior insulation has continuously increased as a result of regulations for energy conservation, and now energy conserving houses have a thickness of insulation material amounting to approx. 20 cm. It is apparent that the construction elements known for heat insulation with only an 8 cm thick body of insulation material does not meet the requirements of energy conserving houses, which results in either protruding exterior parts, such as particularly balconies, being omitted entirely or compromising the heat insulation in the area of protruding exterior parts being intentionally accepted.

SUMMARY

Based on this, the object of the present invention is to provide a construction element for heat insulation of the type mentioned at the outset, which is suitable for the installation in energy conserving houses without compromising the static properties; because the above-mentioned shear force rods only achieve their optimum features when they are installed at an angle of approximately 45°—if this angle inclines less steeply, in order to compensate for an increased thickness of the insulation body, the shear force rod would become correspondingly "weaker" and could no longer fully satisfy the static requirements.

This objective is attained according to the invention in that the construction element is adjusted for the installation in energy conserving houses such that the insulating body, at the side facing toward the supporting construction part, has a protrusion, provided with recesses for the exit sections of the upper section of the shear force rods out of the insulation body, which extends in the direction of the supporting construction part to the area of the horizontally protruding shear force rod sections so that the bent shear force rod sections are entirely overlapped laterally.

In this way, it is possible for the first time to provide an insulating body with the required thickness for energy conserving houses amounting to more than 15 cm and, in particular, to approximately 20 cm, by adding a protrusion to the conventional insulating bodies, which bridges, for example, the lack of thickness in reference to the common 8 cm thick insulation body. This protrusion has a recess each in the area of the exit of the shear force rods at their upper progression, which ensures that the bent section of the shear force rods is surrounded by concrete and thus the shear force rods are supported in a statically sufficient manner. This allows the optimal alignment of the shear force rod of 45° to be maintained within the insulating body without essentially compromising, on the one hand, heat insulation and, on the other hand, the static properties of the shear force rod. The static properties of tensile and pressure force rods, surrounded by the insulating material over the entire thickness of more than 15 cm, is not essentially worsened by the increase in their section not supported by any concrete.

Advantageously, the protrusion is formed with an essentially cubic shape and adjusted to the insulation body having the same height and the same longitudinal extension, with the exit sections left open in the protrusion form recesses for the shear force rods, which have approximately the shape of a segment of a cylinder with an approximately rectangular horizontal cross-section in the area of the shear force rods. This ensures an optimum connection of the concrete filled into the recesses to the adjacent concrete building part and still allows a sufficiently stable anchoring of the shear force rods in the concrete.

When the overall thickness of the insulating body, i.e. the thickness of the insulating body itself plus the thickness of the protrusion amounts to approximately 20 cm, it leads to an overall at least almost square vertical cross-section for conventional heights of construction parts and insulation bodies of the same dimension.

The exit regions of the upper section of the shear force rods left by the protrusion, i.e., the recesses in the insulation body, can be filled, on the one hand, with concrete of the adjacent supporting construction part, with the insulating body operating in the conventional manner as a mold; however, it is also possible for the recesses to be filled with a concrete having other material characteristics, in particular with ultra strong and/or ultra high-performance concrete. Advantageously, this occurs prior to the installation of the construction element, in particular by the manufacturer of the construction element. Using high-performance concrete, which has better heat insulation features in reference to normal steel-reinforced concrete, the partial reduction in the thickness of the insulation body in the recess sections is compensated, which might cause a respective reduction in heat insulation features.

BRIEF DESCRIPTION OF THE DRAWINGS

Additional features and advantages of the present invention are discernible from the following description of an exemplary embodiment, using the drawing; it shows:

FIG. 1 is a side view of a construction element for heat insulation according to the invention; and FIG. 2 is a top view the constriction element for heat insulation.

DETAILED DESCRIPTION OF THE PREFERRED EMBODIMENTS

The construction element 1 shown in FIGS. 1 and 2 for heat insulation comprises an insulating body 2 with an integrated protrusion 3 made from the same insulating body material as well as several reinforcement rods crossing the insulating body, namely in the upper insulating body area in the horizontal direction of the extension of the tension rods 4, in the lower insulating body area in the horizontal direction of the extension of the compression rods 5 as well as the shear force rods 6, with the shear force rods inside the insulating body being provided with an essentially sloped section 6b in vertical planes parallel in reference to one another for a connection to two adjacent concrete construction parts 9, 10 (show in broken lines) at their upper section 6a allocated to the supporting construction part 9 and to its lower section 6c allocated to the supported construction part 10 being bent such in the area 6d, 6e, that they protrude from the insulating body horizontally at different heights in the above-mentioned vertical planes.

The protrusion 3 is arranged on the side of the insulating body 2 facing the supporting construction part and is provided with recesses 7, which are approximately embodied in the shape of a partial cylindrical section and surround an upper exit section 6f of the sloped section 6b of the shear force rods 6, and thus leave it open for an impingement with concrete.

The top view of the construction element 1 according to FIG. 2 shows that the protrusion 3 is provided with the recesses 7 only in the area of the shear force rods 6, so that protrusion areas 8 adjacent to the recesses 7, through which the tensile rods 4 extend, laterally overlap the bent shear force rod sections 6d. Here, it is ensured that the insulating body 2, together with the protrusion 3, has a maximum thickness D, by which the insulation features of this construction element for heat insulation are correspondingly improved. On the other side, the recesses 7 ensure, with the concrete being filled in, for a sufficient support of the shear force rods 6, resulting in the non-supported area of the sloped section 6b of the shear force rods 6 to be correspondingly reduced, and to be approximately equivalent to the dimension of conventional construction elements for heat insulation having insulating bodies, for example, only 8 cm thick. This way, the size of approximately half the length of the sloped section of the shear force rods can be surrounded and supported by concrete in the area of the recesses, while approximately the other half of the sloped section extends in the insulating body without any additional support.

Concluding, the present invention has the advantage to provide a construction element for heat insulation with considerably improved heat insulation features and simultaneously without any and/or hardly any reduced static properties, by surrounding and/or supporting the shear force rods with concrete in an essential part of their sloped section.

The invention claimed is:

1. A construction element for heat insulation between two construction parts, comprising an insulating body (2) to be arranged between the two construction parts which includes reinforcement elements (4, 5, 6) that are adapted to cross between and be connected to the two construction parts, with at least shear force rods (6) being provided as reinforcement elements, which extend in a generally sloped manner inside the insulating body in vertical planes located parallel in reference to one another, and which are bent for connecting to the two construction parts at an upper section (6a) thereof adapted for connection to a supporting construction part and a lower section (6c) thereof adapted for connection to a supported construction part such that the upper and lower sections protrude horizontally from the insulating body at different heights in the vertical planes, the construction element (1) is adjusted for installation in energy conserving houses in that the insulating body (2) is provided with a protrusion (3) on a side facing the supporting construction part, the protrusion includes open recesses (7) at exit areas (6f) of the upper section (6a) of the shear force rods (6) extending from the insulation body, and the protrusion (3) extends in a direction of the supporting construction part to a region of the horizontally protruding shear force rod sections (6a), so that the bent shear force rod sections (6d) are entirely laterally overlapped by the protrusions.

2. A construction element according to claim 1, wherein the protrusion (3) has a generally cubic form adjusted to the insulating body (2) with the same height and the same longitudinal extension.

3. A construction element according to claim 1, wherein the recesses (7) have an approximately partial cylindrical section-shaped form with an approximately rectangular horizontal cross-section in an area of the shear force rods.

4. A construction element according to claim 1, wherein the insulating body (2), together with the protrusion (3) has a thickness (D) equivalent to at least a height of the insulating body (2) so that a generally square vertical cross-section of the insulating body results, with the protrusion being parallel to the vertical planes of the shear force rods (6).

5. A construction element according to claim 1, wherein the insulating body (2) together with the protrusion (3) has a total thickness (D) of at least 15 cm.

6. A construction element according to claim 1, wherein the recesses (7) are filled with concrete so that the concrete surrounds the bent shear force rod sections (6d).

7. A construction element according to claim 6, wherein the concrete is high-performance concrete and/or is filled into the recesses (7) prior to the installation of the construction element (1) at the two construction parts.

8. A construction element according to claim 6, wherein the recesses (7) left free by the protrusion (3) are filled by the concrete of the adjacent concrete construction part.

9. A construction element according to claim 1, further including the supporting construction part comprising a building part connected to the upper section of the shear force rod and the supported construction part comprising a protruding exterior part connected to the lower section of the shear force rod.

* * * * *